US008842312B2

(12) United States Patent
Lao et al.

(10) Patent No.: US 8,842,312 B2
(45) Date of Patent: Sep. 23, 2014

(54) APPLICATION-BASED PROFILES OF PRINTER DRIVER SETTINGS

(75) Inventors: Katherine B. Lao, Concord, CA (US); Naohiko Kosaka, Concord, CA (US)

(73) Assignees: KYOCERA Document Solutions Inc. (JP); KYOCERA Document Solutions Development America, Inc., Concord, CA (US)

( * ) Notice: Subject to any disclaimer, the term of this patent is extended or adjusted under 35 U.S.C. 154(b) by 1064 days.

(21) Appl. No.: 11/986,055

(22) Filed: Nov. 20, 2007

(65) Prior Publication Data

US 2009/0128843 A1    May 21, 2009

(51) Int. Cl.
*G06F 3/12*    (2006.01)

(52) U.S. Cl.
USPC .......................................... 358/1.15; 358/1.1

(58) Field of Classification Search
None
See application file for complete search history.

(56) References Cited

U.S. PATENT DOCUMENTS

| | | | |
|---|---|---|---|
| 5,604,860 A | 2/1997 | McLaughlin | |
| 5,687,301 A | 11/1997 | Stokes | |
| 6,121,968 A | 9/2000 | Arcuri | |
| 6,407,760 B1 | 6/2002 | Aritomi | |
| 6,453,353 B1 * | 9/2002 | Win et al. | 709/229 |
| 6,490,049 B1 * | 12/2002 | Cunnagin et al. | 358/1.13 |
| 6,515,684 B1 | 2/2003 | Knodt | |
| 6,535,229 B1 | 3/2003 | Kraft | |
| 6,570,668 B1 | 5/2003 | Misner | |
| 6,574,002 B1 | 6/2003 | Paczewitz | |
| 6,614,454 B1 | 9/2003 | Livingston | |
| 6,621,532 B1 | 9/2003 | Mandt | |
| 6,625,503 B1 | 9/2003 | Smith | |
| 6,661,437 B1 | 12/2003 | Miller | |
| 6,684,260 B1 | 1/2004 | Foster | |
| 6,940,614 B2 | 9/2005 | Subramaniam | |
| 6,963,411 B1 | 11/2005 | Billow | |
| 7,057,747 B1 | 6/2006 | Minagawa | |
| 2001/0002128 A1 | 5/2001 | Takayama | |
| 2001/0006423 A1 * | 7/2001 | Subramaniam | 358/1.1 |
| 2001/0056406 A1 * | 12/2001 | Nagoya et al. | 705/52 |
| 2002/0035941 A1 | 3/2002 | Nakao | |
| 2002/0047866 A1 | 4/2002 | Matsumoto | |
| 2002/0054146 A1 | 5/2002 | Fukumoto | |
| 2002/0070977 A1 | 6/2002 | Morcos | |
| 2003/0020760 A1 | 1/2003 | Takatsu | |
| 2003/0035012 A1 | 2/2003 | Kurtenbach | |

(Continued)

FOREIGN PATENT DOCUMENTS

JP    2004192219    7/2004

*Primary Examiner* — Marcus T Riley
(74) *Attorney, Agent, or Firm* — McDonnell Boehnen Hulbert & Berghoff LLP

(57) ABSTRACT

A method for managing printer driver settings using application-based profiles, comprising: applying the print settings for the application using application-profile name table and print settings table, and applying selective lock-in print settings process based on the user's administrative privilege status. Profile generation by statistical tracking of use of printing features comprises recording application name and settings in effect for a print job into user's PC registry, the administrator collecting and analyzing this data for all relevant users, and specifying new profiles using this data. Methods also include the administrator's designating administrative status for users including registered unlockers, always locked and conditionally changeable settings, which are differentiated by special icons in GUI menus, password interface, merging of unlocking and change setting steps, monitoring of unlocking operations, administrator feedback and analysis for economical and efficient use of resources, special checkbox and list view GUI for aiding administrator analysis, and adding count tallies for application-settings combinations.

19 Claims, 9 Drawing Sheets

(56) References Cited

U.S. PATENT DOCUMENTS

| | | |
|---|---|---|
| 2003/0043208 A1 | 3/2003 | Staelin |
| 2003/0048309 A1 | 3/2003 | Tambata |
| 2003/0081008 A1 | 5/2003 | Seo |
| 2003/0088793 A1 | 5/2003 | Parry |
| 2003/0169299 A1 | 9/2003 | Kusano |
| 2003/0169300 A1 | 9/2003 | Colgrove |
| 2003/0174177 A1 | 9/2003 | Tsukuda |
| 2003/0184781 A1 | 10/2003 | Laughlin |
| 2004/0120747 A1 | 6/2004 | Okochi |
| 2004/0210767 A1* | 10/2004 | Sinclair et al. ............... 713/201 |
| 2005/0055547 A1* | 3/2005 | Kawamura .................. 713/155 |
| 2005/0210408 A1 | 9/2005 | Baranda |
| 2006/0090143 A1 | 4/2006 | Tanaka |
| 2006/0170947 A1* | 8/2006 | Kurabayashi ............... 358/1.13 |
| 2006/0204270 A1* | 9/2006 | Abe ............................... 399/82 |
| 2006/0282772 A1* | 12/2006 | Chamberlin et al. ......... 715/700 |
| 2007/0124516 A1* | 5/2007 | Ohara et al. .................. 710/62 |
| 2007/0180516 A1* | 8/2007 | Aoki et al. ..................... 726/17 |

* cited by examiner

| Table 9.1 — Tracked data in user A's registry | | |
|---|---|---|
| Name | Type | Data |
| WORD_Monochrome | REG_DWORD | 0x00000002(2) |
| EXCEL_Portrait | REG_DWORD | 0x00000010(10) |
| WORD_Landscape | REG_DWORD | 0x00000215(215) |
| EXCEL_2Nup | REG_DWORD | 0x00000052(52) |
| EXCEL_Booklet | REG_DWORD | 0x00000007(7) |
| WORD_Rotate | REG_DWORD | 0x00000002(2) |
| WORD_Draft | REG_DWORD | 0x00000005(5) |

| Table 9.2 — Tracked data in client B's registry | | |
|---|---|---|
| Name | Type | Data |
| WORD_Monochrome | REG_DWORD | 0x00000010(10) |
| WORD_Landscape | REG_DWORD | 0x00000016(16) |
| WORD_2Nup | REG_DWORD | 0x00000110(110) |
| EXCEL_2Nup | REG_DWORD | 0x00000003(3) |
| EXCEL_Booklet | REG_DWORD | 0x00000027(27) |
| WORD_Rotate | REG_DWORD | 0x00000001(1) |
| WORD_Draft | REG_DWORD | 0x00000005(5) |

| Table 9.3 — Tracked data in administrator's registry | | |
|---|---|---|
| Name | Type | Data |
| WORD_Landscape | REG_DWORD | 0x00000231(231) |
| WORD_2Nup | REG_DWORD | 0x00000110(110) |
| WORD_Monochrome | REG_DWORD | 0x00000012(12) |
| WORD_Draft | REG_DWORD | 0x00000010(10) |
| WORD_Rotate | REG_DWORD | 0x00000003(3) |
| EXCEL_2Nup | REG_DWORD | 0x00000055(55) |
| EXCEL_Booklet | REG_DWORD | 0x00000034(34) |
| EXCEL_Portrait | REG_DWORD | 0x00000010(10) |

FIG. 9

APPLICATION-BASED PROFILES OF PRINTER DRIVER SETTINGS

FIELD OF THE INVENTION

This invention relates to printer driver settings, and more particularly to methods of managing printer driver settings using application-based profiles.

BACKGROUND OF THE INVENTION

In currently used computing systems, a printer driver's initial or default settings are the same across applications. Some systems provide ways of customizing a set of settings into profiles, but current systems do not offer ways in which an administrator can flexibly control which settings and profiles are to be used by each user or by each category of users. Current systems also do not provide means by which administrators can be advised as to which settings or profiles might be beneficial toward achieving the administrator's goal, whether it be minimizing paper use by curtailing wasteful forms of printing, minimizing toner use, or minimizing wear to the printer components. The present invention arose out of the above perceived needs and concerns associated with methods of managing and profiles and printer driver settings, and presents efficient methods of managing settings and profiles involving conditional and selective locking and unlocking of settings, as well as profile generation by statistical tracking of use of printing features.

SUMMARY OF THE INVENTION

Methods, computer program products, computing and printing systems for managing printer driver settings, and more particularly to methods of managing printer driver settings using application-based profiles, are described.

In the computing systems used today, a printer driver's initial or default settings are the same across applications. However, users or administrators might require an application-based setting depending on how an application is being used and on what the general objective is, whether it is saving costs, or getting high-quality prints or security. For example, for imaging applications, users might require high quality printing on a glossy paper with some color correction. On the other hand, for text and graphic applications, users might need 2-up (2-in-1 page) and resource-conserving EcoPrint (economic and ecological mode printing, similar to what is called "EconoMode") printing to save on toner and paper. So printer settings on this scenario are dependent on the application.

Technology currently available for quick changing of settings are printer profiles wherein a batch of settings are available for the user to select based on his printing needs. But the currently available interfaces require users to have more user interface interaction, i.e., open printing preferences, select appropriate profile, then apply the profile, etc. And this needs to be done for every application they want to have a specific printing settings to. In a client-server scenario, or multiple PC scenario, this issue escalates as it should be done per PC per application.

The application-based printing solution being proposed in this invention will select and apply a specified printer profile automatically for an application. It will also provide a system for managing the association of printer profiles with applications. The management tool is typically available only to administrators.

In an embodiment of the invention, a typical use scenario includes the following. An administrator first creates a printer profile (for example, if he wants to reinforce toner and paper saving in the office for word-processing application, he sets 2-in-1 printing and EcoPrint and creates the profile). Some existing printer drivers, including the KxDriver, have ways of creating profiles. An administrator management tool is then used to associate profiles with applications. Administrators will be capable of using any profile (newly defined or pre-defined) and associating it with any application as needed. The only thing he needs to know is the EXE file name or the application name.

The present invention presents efficient methods of managing settings and profiles involving conditional and selective locking and unlocking of settings, as well as profile generation by statistical tracking of use of printing features.

This invention presents a method to specify if a feature is conditionally changeable or always locked. The methods include creating a data file and reading in a data file which determines the category of the feature (whether it is conditionally changeable or always locked); and maintaining an internal representation of this data for display and to keep track of admin preferences. The methods also include a way to display this information so the admin/users can modify them if possible or as needed.

In a further aspect of the invention, manual lock and unlock is enabled, including a method to enter a password to lock-in the whole settings or some of the settings (admin-level), and a method to enter a password to unlock the whole settings or some of the settings (user-level).

In a further aspect of the invention, automatic unlock is enabled, including a method to add, edit, delete authorized "unlockers" (users who can automatically unlock features). In an embodiment of the invention, if a user's login username is in the list, locked-in features are automatically unlocked.

In a yet further aspect of the invention, usage information (including the unlocking activity) is monitored, gathered, and presented to the administrator to form a basis for deciding what profiles to present to the users (normal users and registered unlockers) and which category (normal, conditionally-locked, always locked) to assign to each setting.

The invention will be more fully understood upon consideration of the detailed description below, taken together with the accompanying drawings.

DESCRIPTION OF THE DRAWINGS

FIG. 9 shows three tables containing data created while printing usage is monitored for the purpose of profile generation, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
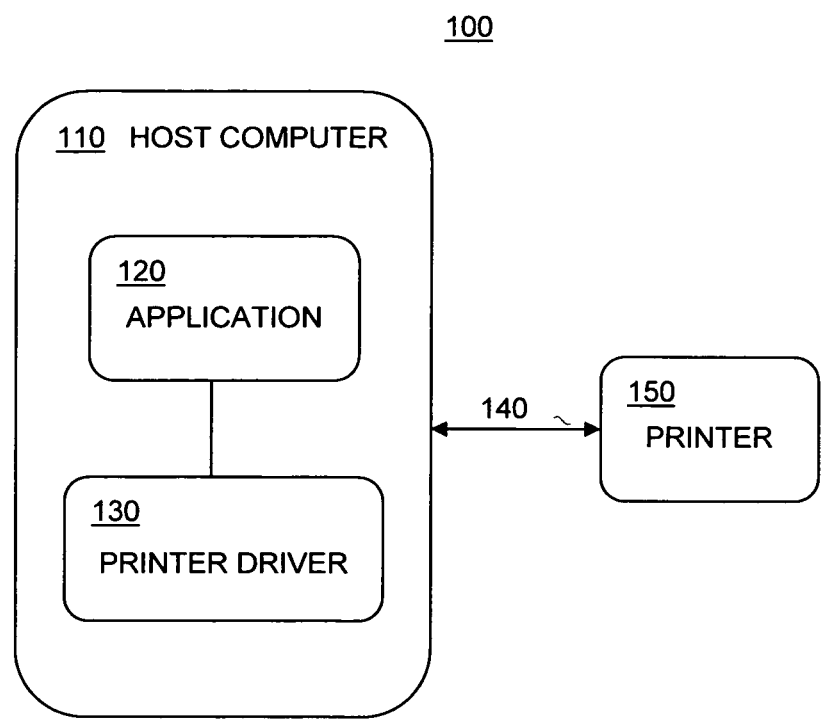
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

Figure 2:
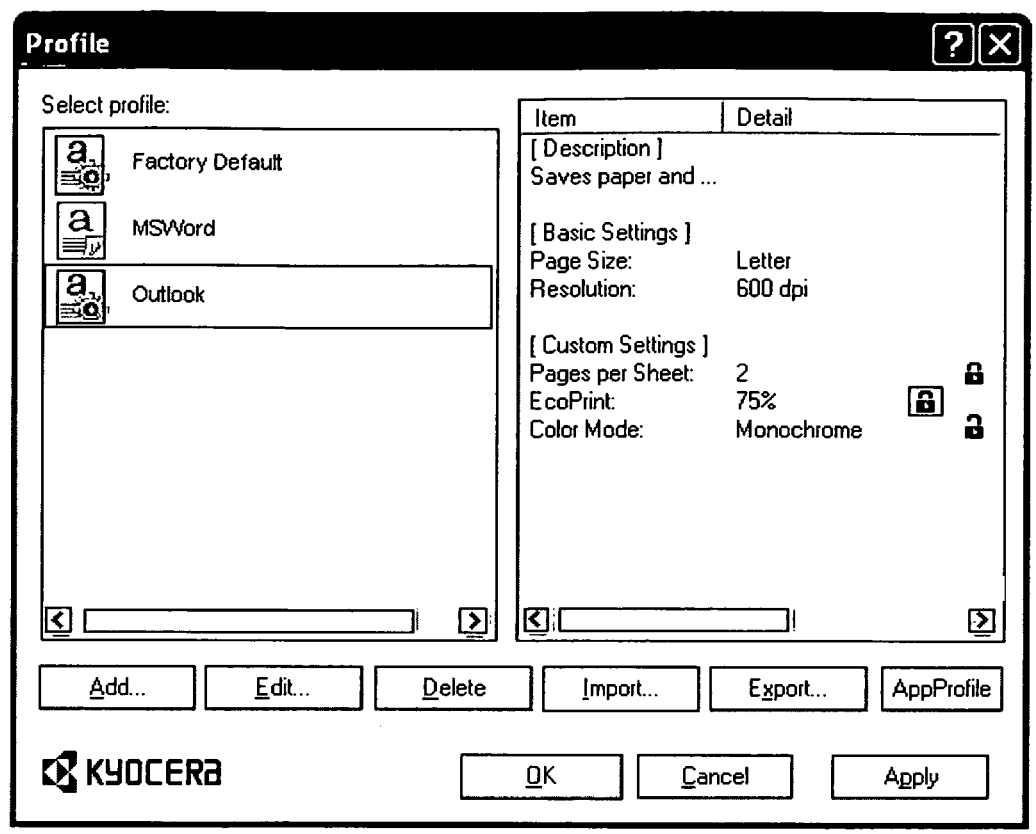
FIG. 2 is a sample GUI menu for displaying the available profiles, in accordance with a preferred embodiment of the present invention.

FIG. 2 is a sample GUI menu for displaying the available profiles, in accordance with a preferred embodiment of the present invention. In this dialog, and using the menus that are accessible from this menu, the administrator and users can lock-in certain features as needed following the processes described below.

Listed under the label "Select profile:" on the left-hand-side of the menu are the currently available profiles. In FIG. 2, three profiles are listed: Factory Default, MSWord, and Outlook. The profiled named "Outlook" is selected, indicated by highlighting. Shown under the labels "Item" and "Detail" are details of the currently selected "Outlook" profile.

Note the three icons showing the padlock icons indicating the (conditionally) locked/unlocked status of the three Custom Settings, namely Pages per Sheet, EcoPrint, and Color Mode. Other settings without the accompanying padlock icons are normal settings, which can be changed by any user at any time.

Of the three settings accompanied by padlock icons, the first setting (Pages per Sheet) is shown to be conditionally locked. A qualifying user can click to unlock it following the process for conditionally locked settings.

The second setting (EcoPrint) is shown to be always locked. This is shown by the highlighting or another form of visual differentiation, which in FIG. 2 is shown by the square box around the padlock icon. The boxed padlock icon is also horizontally displaced for visual differentiation.

The third setting (Color Mode) is shown to be conditionally unlocked. A qualifying user can click to lock it following the process for conditionally locked settings.

In embodiments of the invention, the buttons Add, Edit, Delete, Import, Export, and AppProfile will function as follows. The Add button is used to create a new profile. After selecting desired settings in all printer driver dialog boxes, click Add. In an embodiment of the invention, the Add button may become unavailable when the profile count reaches the maximum threshold number, in which case the user must delete items to make the Add button available again. In an embodiment of the invention, with server profiles displayed in a client/server environment, the Add button is unavailable to a client logged in as a restricted user.

The Edit button is used to change the name, icon, or description of the selected profile. In an embodiment of the invention, this option does not change the driver settings for the profile. To change driver settings, create a new profile. Typically, the Factory Default profile cannot be edited. In an embodiment of the invention, with server profiles displayed in a client/server environment, the Edit button is unavailable to a client logged in as a restricted user.

The Delete button is used to remove a selected profile from the Select profile list. Use Shift or Ctrl key to select multiple items. Typically, the Factory Default profile cannot be deleted. In an embodiment of the invention, with server profiles displayed in a client/server environment, the Delete button is unavailable to a client logged in as a restricted user.

The Import button is used to browse for a valid profile (.KXP file) and copy into your driver. The imported profile name and icon appear in the Select profile list. Only features that are supported by your printing system model are imported. In an embodiment of the invention, with server profiles displayed in a client/server environment, the Import button is unavailable to a client logged in as a restricted user.

The Export button is used to save the selected profile as a .KXP file. Once saved, it can be imported into another printer driver. Typically, the Factory Default profile cannot be exported.

The AppProfile button is used to manage profiles and applications. In an embodiment of the invention, this button is available for use only to Administrators. Clicking this button opens the dialog (Application-based Profiles) shown in FIG. 3.

The OK button is used to end the use of the Profile menu making the changes made to be effective. The Cancel button is used to end the use of the Profile menu without making the changes made to be effective. The Apply button makes the changes made to be effective, without ending the use of the Profile menu.

Figure 3:
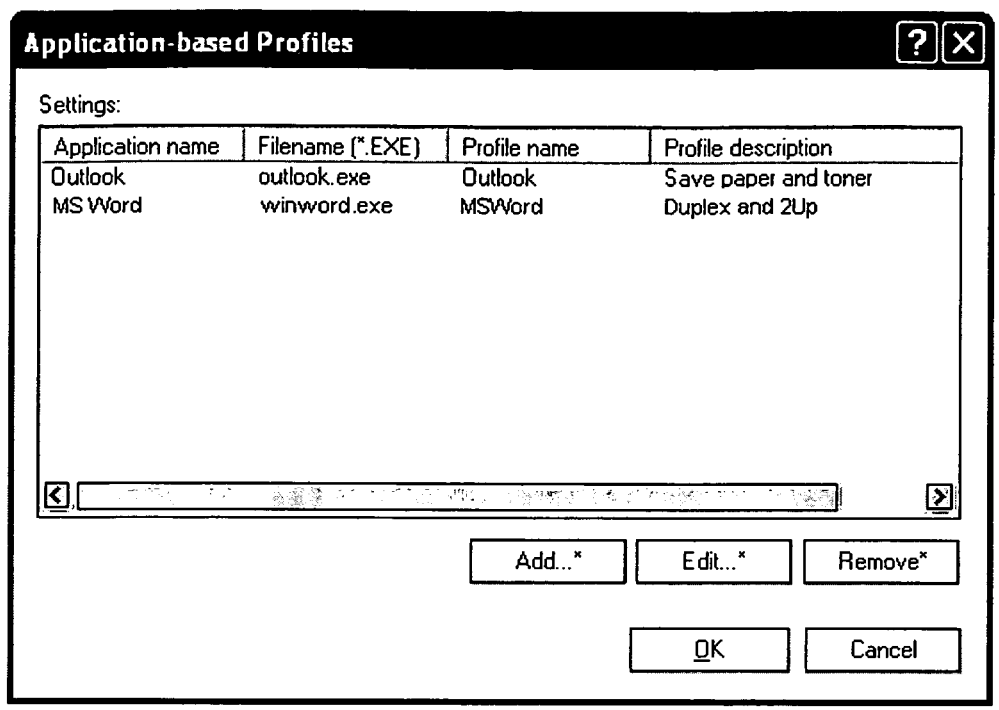
FIG. 3 is a sample GUI menu for displaying the available associations between applications and profiles, in accordance with a preferred embodiment of the present invention.

FIG. 3 is a sample GUI menu for displaying the available associations between applications and profiles, in accordance with a preferred embodiment of the present invention. This is part of the Application-based Profile management tool, showing the list of applications that the administrator wants specific settings for and the associated profile where the specific settings are defined.

The dialog in FIG. 3 indicates that when the application is Outlook (outlook.exe), the corresponding default settings will come from the Outlook profile, and when the application is MS Word (winword.exe), the corresponding default settings will come from the MSWord profile. These two profiles would have been defined earlier in the main profile dialog of FIG. 2.

Add/Edit and Remove buttons are provided to manage the profile application list, in accordance with the Add/Edit application profile association aspects of the present invention. Selecting a profile and clicking the "Remove" button causes the selected profile to be removed. Clicking the "Add" or "Edit" button brings up the next menu shown in FIG. 4.

Figure 4:
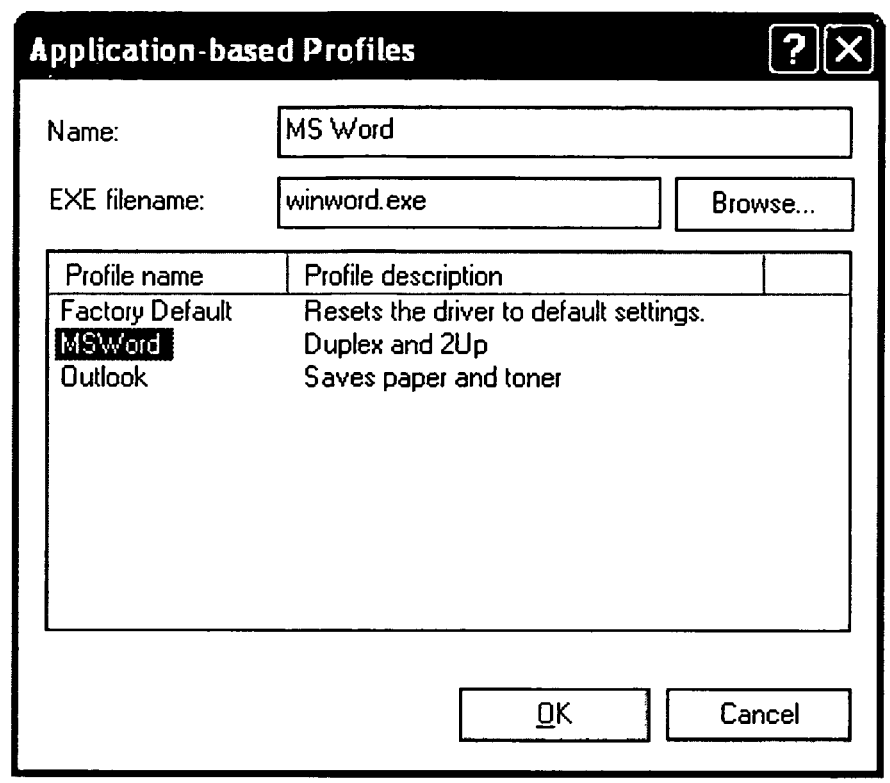
FIG. 4 is a sample GUI menu for making an addition to the available associations between applications and profiles, in accordance with a preferred embodiment of the present invention.

FIG. 4 is a sample GUI menu for making an addition to the available associations between applications and profiles, in accordance with a preferred embodiment of the present invention. The purpose of this menu is so that the Administrator can add/edit application and profile associations. The menu includes the following controls.

The "Name" field can contain any descriptive name which would identify this new association.

The "EXE filename" field should be the exact exe filename of the application. The Browse button helps the user find the needed file. In an embodiment of the invention there is to be only one instance in the list per application The "Profile list" is essentially the same list found in the main Profile dialog; gives the user a selection of profiles it can associate with the application.

Here, the Profile name "MSWord" is selected. At this point, when user clicks OK, those printing in Word will have duplex and 2UP as default settings.

Figure 5:
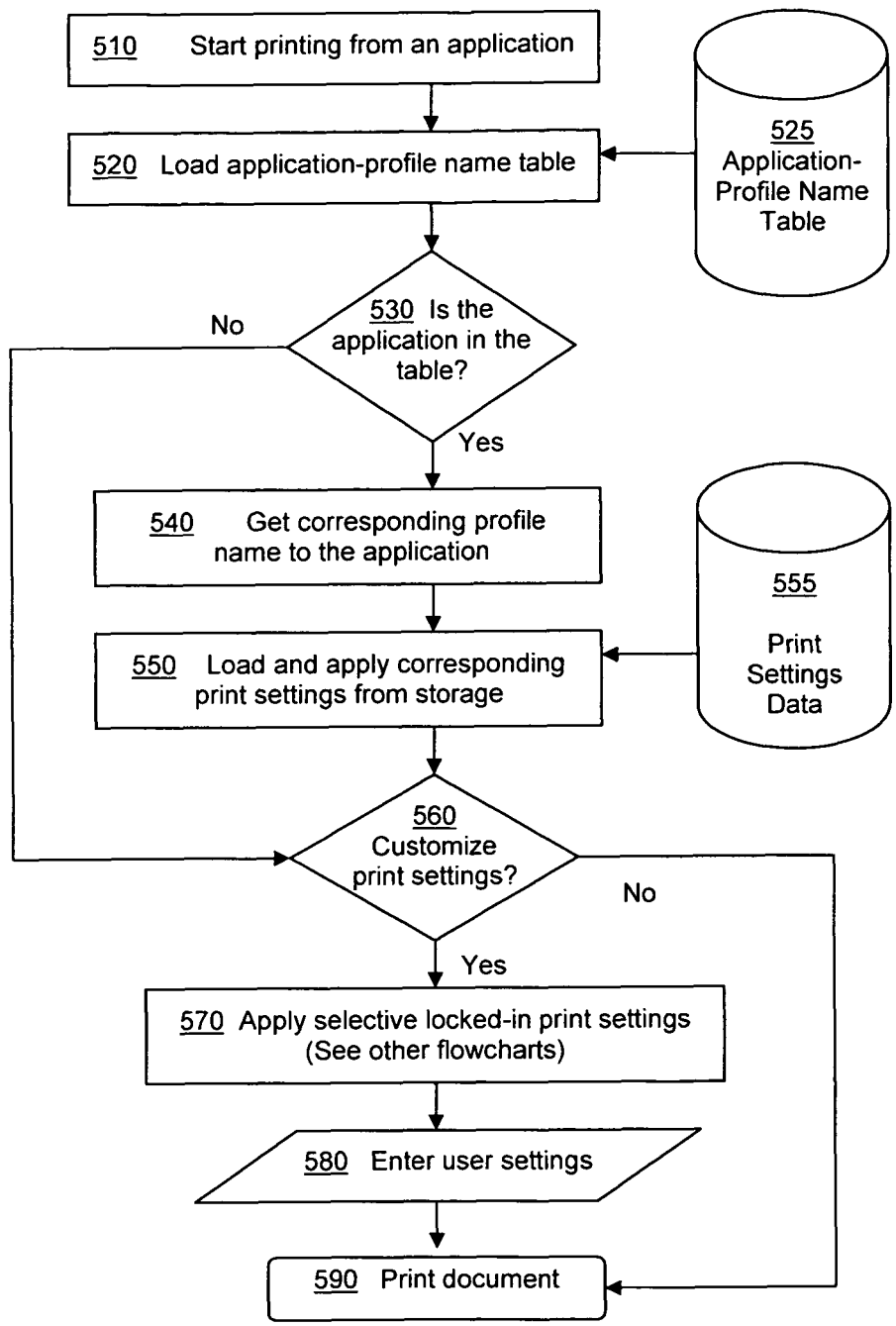
FIG. 5 is a flowchart showing the overall process of printing from an application, in accordance with a preferred embodiment of the present invention.

FIG. 5 is a flowchart showing the overall process of printing from an application, in accordance with a preferred embodiment of the present invention.

In Step 510, the process of printing from an application is started. In Step 520, the application-profile name table is loaded from the application-profile name table 525, which stores names of all the applications for which a profile has been defined.

In Step 530, a determination is made whether the application from which the printing is now started is in the table. If not, the control moves to the Step 560. If it is in the table, the next step (Step 540) is executed.

In Step 540, the profile name corresponding to the application is obtained. In Step 550, the corresponding print settings are loaded from storage and applied to the current settings. The storage here is the print settings data table 555.

In Step 560, a determination is made whether to customize the current settings. If there is to be no customization, the control moves to Step 590 to print the document using the current settings.

Figure 6:
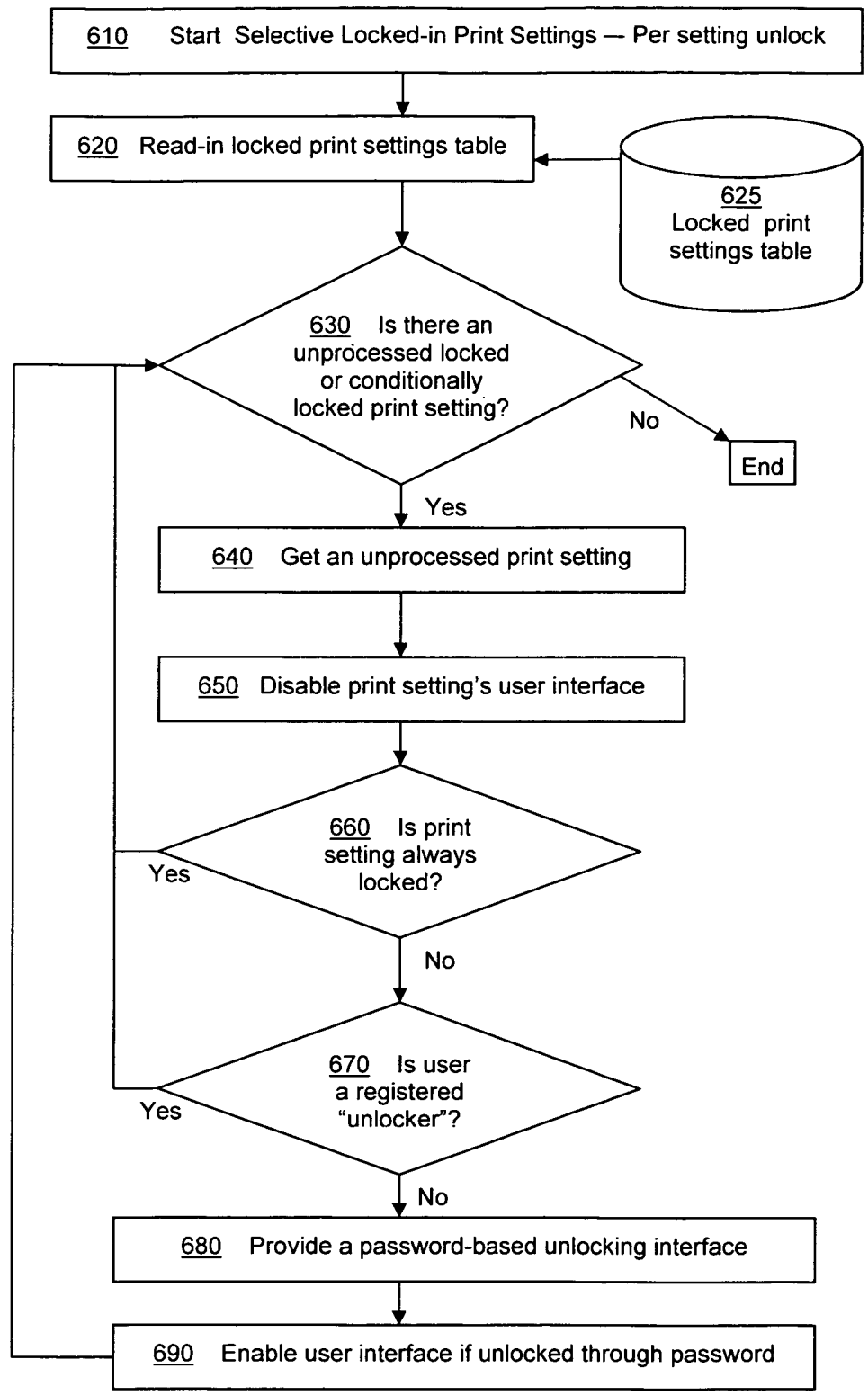
FIG. 6 is a flowchart showing the process of per-setting unlock of selective locked-in print settings, in accordance with a preferred embodiment of the present invention.
Figure 7:
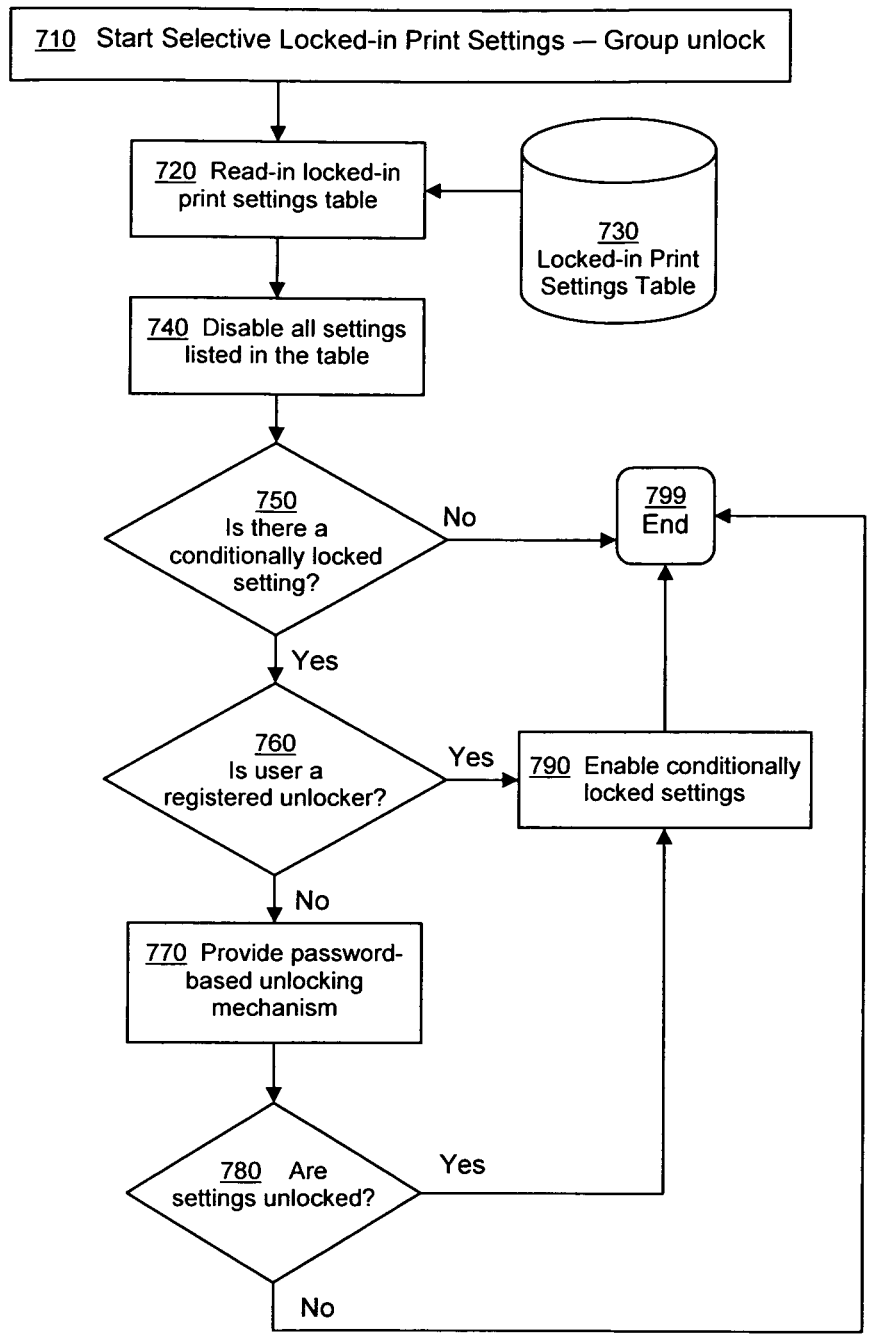
FIG. 7 is a flowchart showing the process of group unlock of selective locked-in print settings, in accordance with a preferred embodiment of the present invention.

In Step 570, processes of the selective locked-in print settings described in connection to the other flowcharts of FIG. 6 and FIG. 7 are performed. In Step 580, additional user input can be entered to adjust and customize the current settings. In Step 590, the document is printed using the settings in effect at that point.

FIG. 6 is a flowchart showing the process of per-setting unlock of selective locked-in print settings, in accordance with a preferred embodiment of the present invention.

In Step 610, the process of the selective locked-in print settings (per setting unlock) is started. In Step 620, locked print settings table is read in from the locked print settings table 625.

In Step 630, a determination is made whether there is an unprocessed locked or conditionally locked print setting. If not, the control moves to the End. If there is such an unprocessed setting, the next step is executed.

In Step 640, an unprocessed print setting is obtained from the list of currently unprocessed locked or conditionally locked print settings. Then in Step 650 the setting corresponding to the obtained unprocessed print setting is disabled.

In Step 660, a determination is made whether the print setting is always locked. If not, the control moves to the next step. If it is always locked, then the control moves back to Step 630.

In Step 670, a determination is made whether the current user is a registered unlocker. If the current user is a registered unlocker, the setting can be unlocked and the control moves back to Step 630.

In Step 680, a password-based unlocking interface is presented to the current user. In Step 690, if the setting is unlocked through a password, the user interface is enabled, and the control moves back to Step 630.

FIG. 7 is a flowchart showing the process of group unlock of selective locked-in print settings, in accordance with a preferred embodiment of the present invention. In Step 710, the process of the selective locked-in print settings (group unlock) is started.

In Step 720, locked-in print settings table is read in from the locked-in print settings table 730. In Step 740, all settings listed in the table are disabled.

In Step 750, a determination is made whether there is a conditionally locked setting. If not, the control moves to the End 799. If there is such a conditionally locked setting, the next step is executed.

In Step 760, a determination is made whether the user is a registered unlocker. If so, the conditionally locked setting is enabled in Step 790 and the control moves to the End 799. If not, the next step (Step 770) is executed. In Step 770, a password-based unlocking interface is presented to the current user.

In Step 780, a determination is made whether the settings become unlocked. If so, then the conditionally locked setting is enabled in Step 790 and the control moves to the End 799. If not, the control moves to the End 799 without executing Step 790.

In an embodiment of the present invention, entering a password through the password-based unlocking interface causes all the settings in the group of conditionally locked settings to be unlocked. This avoids the need to enter the password multiple times to unlock different settings.

The conditional and selective locking/unlocking features are presented to the user through the GUI menus shown in FIGS. 2, 3 and 4. Using the selective locked-in features, the management tool using the methods of the present invention can also set certain printer settings as non-changeable (locked-in) or conditionally changeable.

Using an embodiment of the invention, the driver reads in a data file which lists up configurable settings and categorizes them as either conditionally changeable or always locked. Data from this data file will be the base "locked print settings table". Each profile created will have a corresponding locked print settings table, tweaked by the admin for his or the company's needs. A GUI is provided to allow users/admin to change conditionally changeable settings to and from a locked state and to show always locked-in settings.

During the application-based printing, the "locked print settings table" associated with the profile that is linked to the application is also loaded and this table decides the GUI, whether some features are grayed-out/locked-in or not, for the user's final configuration of the print settings.

The settings categories include "always locked" and "conditionally changeable." For "always locked" settings, users and administrators are not allowed to change them as it defeats the driver's purpose. This is applicable to custom printer drivers wherein settings are more or less fixed.

For "conditionally changeable" settings, in an administrator level, he could either lock-in the feature setting and/or he could let other users still change it if given edit rights. When the feature setting is locked in, normal users cannot change that feature's settings (probably grayed out in the GUI).

For "conditionally changeable" settings, special users can be given the option to unlock the feature for their use. Unlocking of feature is done through passwords or a registered user list. The management tool can set a password for the locked-in features. Those who have the "right" to unlock the features are then given the password and they are provided with a way to enter the password to unlock the features. Another way to unlock the features is by registering usernames of authorized "unlockers." If the user is identified as an authorized unlocker by matching his login name to the list of authorized unlockers, the GUI displayed to him has the feature automatically unlocked. A combination of password and registered usernames can be used for this unlocking feature.

In an embodiment of the present invention, unlocking a setting and changing the setting can be two separate steps. In another embodiment, the two steps can be combined into one step, which can be specified by the administrator for each setting, user's "registered unlocker" level, etc.

A data file to implement the methods of the invention could be in binary for performance. The data file in an embodiment would include the following fields, for example: NUP, CONDITIONAL_LOCK (default is locked). EcoPrint, ALWAYS_LOCKED. Colormode, CONDITIONAL_UNLOCK (default is unlocked).

Figure 8:
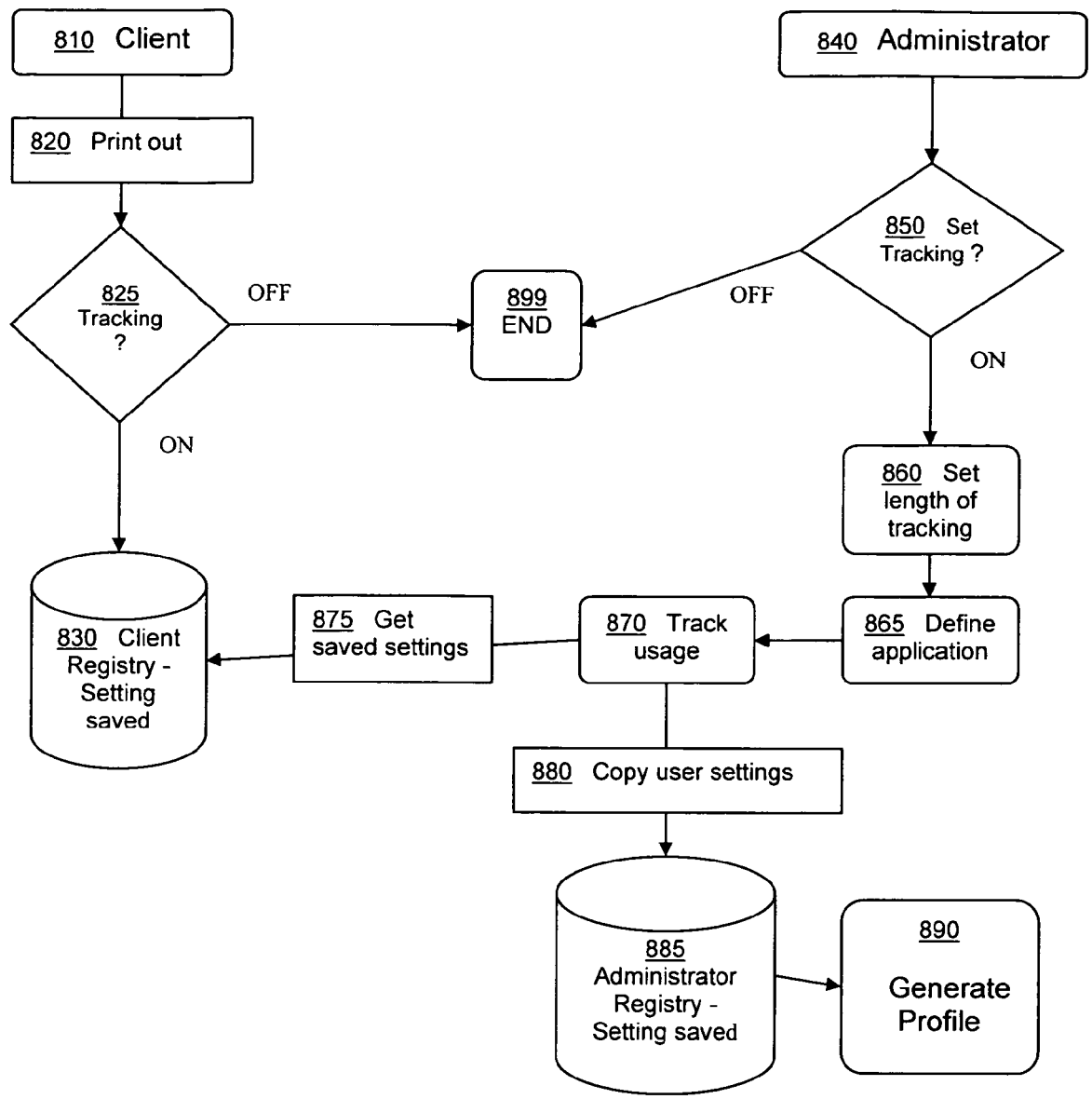
FIG. 8 is a flow and block diagram showing the process of profile generation by statistical usage monitoring, in accordance with a preferred embodiment of the present invention.

FIG. 8 is a flow and block diagram showing the process of profile generation by statistical usage monitoring, in accordance with a preferred embodiment of the present invention.

The figure shows how the processes regarding the Client 810 and the Administrator 840 combine to achieve profile generation by statistical monitoring.

When the user or client initiates a print-out 820 from an application, first a determination is made in Step 825 to see if tracking is being performed. If the tracking is OFF, the processing at the Client side ends 899.

If the tracking is ON, the settings in effect when the print-out is performed are saved in the Client Registry 830. Typically this is saved in the Registry entry of the Client's PC.

On the Administrator 840 side, the Administrator determines if tracking is to be performed 850. If the tracking is OFF, the processing at the administrator side ends 899.

If the tracking is to be ON, the administrator specifies the length of tracking duration-for one week, one month, etc. The administrator can optionally specify the subset of applications for which tracking is to be performed 865.

The administrator can monitor the tracked usage information at Step 870, which causes saved setting and statistical information to be retrieved 875 from the Client Registry 830 where the information is saved.

All such data are copied and totaled from the relevant users' PCs 880 and the resulting setting information is saved in the Administrator Registry 885. In an embodiment, the process of obtaining information from the users' PC registry entries comprises adding the all corresponding count tallies for each combination of application and printer driver setting. This information is then used to generate the profiles 890 using the procedures described below.

In another aspect of the present invention, a profile generator offers a user or administrator a set of recommended profiles based on the tracked usage of each printer settings for each application. An administrator tracks and monitors the usage of each printer setting (main features of the Kx printer driver) used by the clients to create a recommended profile for each application. The created profiles will be used by clients, who only want to print documents without altering any printer settings. For example, each main settings used in a certain application by 10 users will be monitored. That statistical result will be used to create a profile that includes most commonly used features and which is generally usable to all 10 users by results.

The profile generator can also be used to create common profiles, a set of profiles that contains specific settings generally suited for a specific job/document/task. Currently available common profiles are very document-specific such as "Fast 2Nup (Draft print quality with 2 pages on 1 sheet)" and "Presentation on Transparency (Transparency interleaving and high quality printing). These are available for and upon installation with the KX Driver Post installer. With the addition of the common Profile Generator, not only a profile for a specific job/document/task, but also for a specific application can be created and distributed as a recommended and/or common profile. The created profile can be useful in a way that the user can print close to the expectation without knowing much about the printer settings and also doesn't need to know which setting to use when printing certain jobs and documents.

Generation of a recommended profile requires three basic steps. First is tracking data and monitoring the usage of the clients. Second is acquiring data from the clients by tracking which settings are used. Third is generating profile based on the acquired data. Also, a Profile Generator feature is customizable to suit the various needs. FIG. 8 shows the general flow of the profile generation process.

Step 1. Track data. Common features used by a client will be saved into a client's registry. Tables 9.1 and 9.2 in FIG. 9 show examples of tracked data (for a certain period of time) of a client A's and client B's registry. The first column "Name" contains the name of the application followed by name of the feature that is tracked. The second column "Type" is the format of the data, and the third column "Data" contains how many times that feature has been used. In FIG. 9, Table 9.1 shows tracked data in user A's registry, and Table 9.2 shows tracked data in client B's registry.

When a client prints out a document, with a certain feature turned ON, then that information will be added to the registry. If there is already an entry with the same name, then the Data section will just be incremented. If there is no entry yet, then the new string will be created for the new tracking item.

Step 2. Acquire data. The administrator reads in the data from each client registry and saves the sum of all features into the administrator's registry. Table 9.3 shows the sum of the data for the features used by client A and client B. The resulting data is typically stored as tracked data in administrator's registry.

The administrator can also monitor the data for each user, before the counts are summed up, looking for signs of waste or anomaly. Some users' unusually high volume of paper use can be monitored and flagged by the system.

Step 3. Generate Profile. Tracked data sets can be viewed in a list view format by the administrator. This list view is a conversion of Table 9.3 for easy viewing by the administrator. Each item or row in the list contains a checkbox. If the checkbox is ON, then that item will be included into the custom profile for that application. If the checkbox is OFF, then it will be excluded from the custom profile. For example, if the features "2Nup", "Draft" and "Monochrome" are selected for the application "Word", then the generated profile will only includes those features. By default, the items in a table are ordered by most used feature to a least used feature and separated by application name. From this table, the admin can create a custom profile available to all users depending on a usage of each feature. This form of automatic profile generation aids standardization of printer output by encouraging all users to conform to standardized settings.

Customizable settings for the administrator include the following procedures.

Turn tracking ON and OFF. Tracking can be turned ON and OFF as needed. Turn ON to acquire usage and record. Turn OFF to disable tracking of usage and the previous saved usage counter will reset to 0.

Set the length of tracking period. The administrator can set the length of tracking period. The administrator can track the usage of each client for 1 week to acquire the necessary information to generate a profile. Default is 1 week and length can be changed.

Define the application name that needs to be tracked. The administrator can defined which application(s) will be tracked. If nothing is defined then all application will be tracked. For example, if the defined application names are "WORD" and "EXCEL", then only settings used in those applications will be tracked.

Administrator controlled usage. This feature is only locked to the administrator. The controls for Profile Generator are hidden from the client view. Only a user with administrator privilege can maintain tracking to create a profile for standard users.

In an embodiment of the invention, the tracked usage includes data about estimated toner usage, and usage of other items, such as color ink and toner, staples, amount of blank space on the pages, etc. In another embodiment of the invention, another set of information presented to the administrator is information regarding the amount and nature of unlocking and changing of the settings performed by the users. The nature of unlocking includes the mode of unlocking, such as use of password-interface, per-setting unlock, group unlock, etc. This information is gathered and given to the administrator to form a basis for deciding what profiles to present to the users (normal users and registered unlockers) and which category (normal, conditionally-locked, always locked) to assign to each setting. For example, if too much blank space in printed pages for certain applications is detected, the administrator may consider using profiles including 2-up, draft mode, or EcoPrint for those printing situations to reduce waste of paper.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for processing a print job from an application through a printer driver for a user, comprising:

previously designating by an administrator to each user, the user's administrative privilege status, the user's registered unlocker level, and the user's administrator level;

determining a name corresponding to the application;

upon finding the name corresponding to the application in an application-profile name table, which stores names of all applications for which a profile has been defined by an administrator to associate an application with a set of print settings, loading and applying to at least one current print setting at least one print setting corresponding to the name corresponding to the application in a print settings data table; and then customizing the current settings by applying a selective lock-in print settings process, wherein a setting designated by the administrator as always locked is not subject to the selective lock-in print settings process, users and administrators are not allowed to change a setting designated by the administrator as always locked, which always locked setting is applicable to a custom printer driver wherein settings are fixed, and wherein a setting designated by the administrator as conditionally changeable is subject to the selective lock-in print settings process, and for the setting designated by the administer as conditionally changeable, in an administrator level, the administrator can lock-in a feature setting, wherein when the feature setting is locked-in, normal users cannot change that feature's setting, or the administrator can let other users still change the feature setting if given edit rights, wherein the administrator designates the registered unlocker level for each user by specifying each of the print settings as one of (i) always locked, (ii) conditionally changeable, and (iii) always unlocked, which selective lock-in print setting process enables a user to change a subset of current print settings based on the user's administrative privilege status, and based on each setting's status as designated by an administrator, wherein, for each of the current settings, after determining and deciding using a microprocessor the setting's status as designated by an administrator and the user's administrative privilege status, if the user's administrative privilege status allows for changing the setting, the setting is changed, and wherein, during the selected lock-in print setting process, a setting designated by the administrator as conditionally changeable enables the user to change the setting designated by the administrator as conditionally changeable after unlocking the setting and changing the state of the setting from conditionally locked to conditionally unlocked, if the user is a registered unlocker and optional if the user presented with a password interface enters a permissible password, and which selective lock-in print setting process comprises per setting unlock process and group unlock process, wherein within per setting unlock process, for a print setting that is not always locked, if a current user is a registered unlocker, the print setting is unlocked, and within group unlock process, for a print setting that is conditionally locked, if a current user is a registered unlocker, the print setting is enabled.

2. The method of claim 1, wherein the applying of the selective lock-in print settings process based on the user's administrative privilege status comprises upon determining the user's registered unlocker level and administrator level previously designated by an administrator, allowing the user to unlock at least one setting.

3. The method of claim 1, wherein the selective lock-in print settings process comprises presenting a password interface to the user, and if the user enters a permissible password, the at least one setting can be unlocked, optionally allowing all settings that the user specifies to be unlocked.

4. The method of claim 1, wherein a setting designated as always locked and a setting designated as conditionally changeable are differentiated by special icons, and wherein the selective lock-in print settings process comprises automatically changing a setting after the setting is unlocked.

5. A method for processing a print job from an application through a printer driver for a user, comprising:

recording the user's printing details information comprising usage monitoring for each feature that is tracked, wherein tracked features and tracking duration are specified by an administrator;

wherein the administrator tracks each of the printing details information as one of (i) always locked, (ii) conditionally changeable, and (iii) always unlocked, for each user, an administrator collecting and analyzing the printing details information; and the administrator giving feedback to the user regarding the user's printing behavior patterns.

6. The method of claim 5, wherein the recording of the user's printing details information comprises recording an application name and printer driver settings in effect at the time of printing from the application into the user's PC registry;

the administrator collecting and analyzing the printing details information comprises obtaining information from at least one user's PC registry; and the administrator giving feedback comprises the administrator specifying profile, wherein each profile associates an application with a set of print settings.

7. The method of claim 6, wherein obtaining information from at least one user's PC registry comprises adding at least one count tally for each combination of application and printer driver setting; and the administrator specifying profiles comprises the administrator being presented with a list view of the result of the adding of the at least one count tally, and specifying at least one combination of an application and a print setting to generate a profile, wherein each profile associates an application with a set of print settings.

8. A computing system for processing a print job from an application through a print driver for a user, comprising:

previously designating by an administrator to each user, the user's administrative privilege status, the user's registered unlocker level, and the user's administrator level;

determining a name corresponding to the application;

upon finding the name corresponding to the application in an application-profile name table, which stores names of all applications for which a profile has been defined by an administrator to associate an application with a set of print settings, loading and applying to at least one current print setting at least one print setting corresponding to the name corresponding to the application in a print settings data table; and then customizing the current settings by applying a selective lock-in print settings process, wherein a setting designated by the administrator as always locked is not subject to the selective lock-in print settings process, users and administrators are not allowed to change a setting designed by the administrator as always locked, which always locked setting is applicable to a custom printer driver wherein settings are fixed, and wherein a setting designated by the administrator as conditionally changeable designated by the administrator as conditionally changeable, in an administrator level, the administrator can lock-in a feature setting, wherein when the feature setting is locked in, normal users cannot change that feature's settings, or the administrator can let other users still change the feature setting if given edit rights, wherein the administrator designates the registered unlocker level for each user by specifying each of the print settings as one of (i) always locked, (ii) conditionally changeable, and (iii) always unlocked, which selective lock-in print setting process enables a user to change a subset of current print settings based on the user's administrative privilege status, and based on each setting's status as designated by an administrator, wherein, for each of the current settings, after determining and deciding using a microprocessor the setting's status as designated by an administrator and the user's administrative privilege status, if the user's administrative privilege status allows for changing the setting, the setting is changed, and wherein, during the selected lock-in print setting process, a setting designated by the administrator as conditionally changeable enables the user to change the setting designated by the administrator as conditionally changeable after unlocking the setting and changing the state of the setting from conditionally locked to conditionally unlocked, if the user is a registered unlocker and optionally if the user presented with a password interface enters a permissible password, and which selective lock-in print setting process comprises per setting unlock process and group unlock process, wherein within per setting unlock process, for a print setting that is not always locked, if a current user is a registered unlocker, the print setting is unlocked, and within group unlock process, for a print setting that is conditionally locked, if a current user is a registered unlocker, the print setting is enabled.

9. The computing system of claim 8, wherein the applying of the selective lock-in print settings process based on the user's administrative privilege status comprises upon determining the user's registered unlocker level and administrator level previously designated by an administrator, allowing the user to unlock at least one setting.

10. The computing system of claim 8, wherein the selective lock-in print settings process comprises presenting a password interface to the user, and if the user enters a permissible password, the at least one setting can be unlocked, optionally allowing all settings that the user specifies to be unlocked.

11. The computing system of claim 8, further comprising:
recording the user's printing details information comprising usage monitoring for each feature that is tracked, wherein tracked features and tracking duration are specified by an administrator;
an administrator collecting and analyzing the printing details information; and
the administrator giving feedback to the user regarding the user's printing behavior patterns.

12. The computing system of claim 11, wherein
the recording of the user's printing details information comprises recording an application name and printer driver settings in effect at the time of printing from the application to the user's PC registry;
the administrator collecting and analyzing the printing details information comprises obtaining information from at least one user's PC registry; and
the administrator giving feedback comprises the administrator specifying profile, wherein each profile associates an application with a set of print settings.

13. The computing system of claim 12, wherein
the obtaining information from at least one user's PC registry comprising adding at least one count tally for each combination of application and printer driver setting; and
the administrator specifying profiles comprises the administrator being presented with a list view of the result of the adding of the at least one count tally, and specifying at least one combination of an application and a print setting to generate a profile, wherein each profile associates an application with a set of print settings.

14. A computer program product stored in a non-transitory computer-readable storage medium for processing a print data to a printer, comprising machine-readable code for causing a machine to perform the method steps of:
previously designating by an administrator to each user, the user's administrative privilege status, the user's registered unlocker level, and the user's administrator level;
determining a name corresponding to the application;
upon finding the name corresponding to the application in an application-profile name table, which stores names of all applications for which a profile has been defined by an administrator to associate an application with a set of print settings, loading and applying to at least one current print setting at least one print setting corresponding to the name corresponding to the application in a print settings data table; and
then customizing the current settings by applying a selective lock-in print settings process,
wherein a setting designated by the administrator as always locked is not subject to the selective lock-in print settings process, users and administrators are not allowed to change a setting designed by the administrator as always locked, which always locked setting is applicable to a custom printer driver wherein settings are fixed, and wherein a setting designated by the administrator as conditionally changeable designated by the administrator as conditionally changeable, in an administrator level, the administrator can lock-in a feature setting, wherein when the feature setting is locked in, normal users cannot change that feature's settings, or the administrator can let other users still change the feature setting if given edit rights,
wherein the administrator designates the registered unlocker level for each user by specifying each of the print settings as one of (i) always locked, (ii) conditionally changeable, and (iii) always unlocked,
which selective lock-in print setting process enables a user to change a subset of current print settings based on the user's administrative privilege status, and based on each setting's status as designated by an administrator, wherein, for each of the current settings, after determining and deciding using a microprocessor the setting's status as designated by an administrator and the user's administrative privilege status, if the user's administrative privilege status allows for changing the setting, the setting is changed, and wherein, during the selected lock-in print setting process, a setting designated by the administrator as conditionally changeable enables the user to change the setting designated by the administrator as conditionally changeable after unlocking the setting and changing the state of the setting from conditionally locked to conditionally unlocked, if the user is a registered unlocker and optionally if the user presented with a password interface enters a permissible password, and
which selective lock-in print setting process comprises per setting unlock process and group unlock process, wherein
within per setting unlock process, for a print setting that is not always locked, if a current user is a registered unlocker, the print setting is unlocked, and
within group unlock process, for a print setting that is conditionally locked, if a current user is a registered unlocker, the print setting is enabled.

15. The computer program product of claim 14, wherein the applying of the selective lock-in print settings process based on the user's administrative privilege status comprises upon determining the user's registered unlocker level and administrator level previously designated by an administrator, allowing the user to unlock at least one setting.

16. The computer program product of claim 14, wherein the selective lock-in print settings process comprises presenting a password interface to the user, and if the user enters a permissible password, the at least one setting can be unlocked, optionally allowing all settings that the user specifies to be unlocked.

17. The computer program product of claim 14, further comprising the method steps of:
   recording the user's printing details information comprising usage monitoring for each feature that is tracked, wherein tracked features and tracking duration are specified by an administrator;
   an administrator collecting and analyzing the printing details information; and
   the administrator giving feedback to the user regarding the user's printing behavior patterns.

18. The computer program product of claim 17, wherein the recording of the user's printing details information comprises recording an application name and printer driver settings in effect at the time of printing from the application into the user's PC registry;
   the administrator collecting and analyzing the printing details information comprises obtaining information from at least one user's PC registry; and
   the administrator giving feedback comprises the administrator specifying profile, wherein each profile associates an application with a set of print settings.

19. The computer program product of claim 18, wherein the obtaining information from at least one user's PC registry comprises adding at least one count tally for each combination of application and printer driver setting; and
   the administrator specifying profiles comprises the administrator being presented with a list view of the result of the adding of the at least one count tally, and specifying at least one combination of an application and a print setting to generate a profile, wherein each profile associates an application with a set of print settings.

* * * * *